United States Patent
Kono et al.

(10) Patent No.: US 7,039,849 B2
(45) Date of Patent: May 2, 2006

(54) DATA DECODER AND METHOD OF DECODING DATA

(75) Inventors: Tadayoshi Kono, Kawasaki (JP); Mitsuhiko Ohta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 461 days.

(21) Appl. No.: 10/436,144

(22) Filed: May 13, 2003

(65) Prior Publication Data

US 2003/0226093 A1    Dec. 4, 2003

(30) Foreign Application Priority Data

May 28, 2002    (JP) .............................. 2002-153943

(51) Int. Cl.
*H03M 13/00* (2006.01)
(52) U.S. Cl. ...................... 714/775; 714/776; 709/236; 370/509; 357/368; 398/154
(58) Field of Classification Search ........ 714/775–776; 709/236; 370/509; 357/368; 398/154
See application file for complete search history.

(56) References Cited

U.S. PATENT DOCUMENTS 6,298,387 B1 *  10/2001  Prasad et al. ............... 709/236

OTHER PUBLICATIONS

Lampow-Maundy et al. 'Frame synchronization in guided scrambling line codes,' IEEE Transactions on Communications, Dec. 2000, vol.: 48 , Issue: 12 On page(s): 1992-1996.*
Fair et al. 'Metric based node synchronization of the Viterbi decoder,' IEEE 1997 Canadian Conference on Electrical and Computer Engineering, May 25-28, 1997 vol.: 1, page(s): 78-82 vol. 1.*
Sharp et al. 'Detection of variable message lengths for NATO Improved Link Eleven using CRC codes,' Military Communications Conference, 1991. MILCOM '91, Conference Record, 'Military Communications in a Changing World'., IEEE; Nov. 4-7, 1991; page(s): 910-4.*

* cited by examiner

*Primary Examiner*—Guy J. Lamarre
(74) *Attorney, Agent, or Firm*—Staas & Halsey LLP

(57) ABSTRACT

A detecting circuit detects a boundary in a bit stream which is coded in compliance with a predetermined rule. The boundary is a point at which discontinuity of reproduction time occurs. An inverting circuit inverts a specific bit in a header of a succeeding bit stream immediately subsequent to the boundary, in response to the detection of the boundary by the detecting circuit. The boundary can thus be detected easily by simply monitoring the specific bit, for example, in outputting the decoded bit streams. This consequently facilitates synchronous management and the like of the bit streams. The specific bit is included in the bit stream. Thus, detecting the specific bit allows simple and accurate detection of the boundary at which discontinuity of the reproduction time occurs.

7 Claims, 8 Drawing Sheets

DATA DECODER AND METHOD OF DECODING DATA

CROSS REFERENCE TO RELATED APPLICATION

This application is based upon and claims the benefit of priority from the prior Japanese Patent Application No. 2002-153943, filed May 28, 2002, the entire contents of which are incorporated herein by reference.

BACKGROUND OF THE INVENTION

1. Field of the Invention

The present invention relates to a data decoder and a method of decoding data for decoding picture and voice bit stream data that is coded in accordance with the MPEG (Moving Picture Experts Group) standards.

2. Description of the Related Art

Among the standards which adopt the MPEG standards is the DVD standard. DVD presentation data is handled as program streams in the MPEG2 standard.

FIG. 1 shows an overview of a synchronous management control exercised by a DVD decoder.

The DVD decoder has an internal clock (reference clock) which is called STC (System Target Clock or System Time Clock). The DVD decoder operates the STC to count from zero concurrently with the start of reproduction. Meanwhile, the data recorded on a DVD has multiple PTSs (Presentation Time Stamps). The PTSs are information on the reproduction time for outputting (displaying or sounding) video data, audio data, and sub-picture data (closed caption data).

The DVD decoder starts the STC concurrently with the start of reproduction, and monitors the STC and the PTS periodically. When the STC and the PTS coincide with each other, the DVD decoder outputs the video data, the audio data, and the sub-picture data. While the DVD is reproduced normally, the PTS increases monotonously. Here, the DVD decoder starts the STC counting from zero as mentioned above, and sequentially reproduces bit stream data (frame data) that contains PTSs coincident with the STC.

In DVD playback, a deviation may occur between the PTS and the STC because of a pause, a fast-forward, etc. For example, between times Ta and Tb shown in FIG. 1, the PTS is delaying from the STC gradually (STC>PTS). This indicates a delay in the data reproduction. When the PTS is smaller than the STC, the DVD decoder discards a bit stream(s) to be decoded, thereby advancing the PTS to become coincident with the STC (time Tb). Between times Tc and Td, the PTS is getting ahead of the STC gradually (STC<PTS). This indicates that the data reproduction is quickening. When the PTS is greater than the STC, the DVD decoder temporarily holds the bit stream, thereby stopping the PTS forwarding so that the PTS and the STC coincide with each other (from the time Td to the time Te). Such an operation of making the PTS coincide with the STC is called a synchronous management control, which is indispensable to DVD players.

FIG. 2 shows an example of a DVD playback method of a DVD player.

DVD playback methods include (1) parental lock, (2) multi story, (3) multi angle, and (4) branching story. These playback methods are referred to as seamless playback. The seamless playback is a special playback technique unique to DVD for reproducing a plurality of different bit streams, as if they were a single bit stream, by virtually connecting them.

In this example, a continuous bit stream from VOBU#1 to VOBU#5 is recorded on the DVD. In addition, a bit stream VOBU#3' is recorded on the DVD in a position different from that of VOBU#1-VOBU#5. Here, a VOBU (Video Object Unit) is a minimum unit of bit stream in the DVD standard. A VOBU contains video data, audio data, and sub-picture data, as well as navigation data (information for controlling reproduction) including PTSs. In the diagram, the hexadecimal numbers in the VOBU boxes represent the values of the PTSs.

The DVD decoder decodes bit streams on a VOBU basis for reproduction. Assume, for example, that the VOBU#3 includes a scene of violence. A parent who operates the DVD player shall keep the scene out of a child's sight, switching the VOBU#3 with the VOBU#3', which includes a gentle scene, for reproduction (parental lock playback). VOBU#3' is not continuous with VOBU#2, VOBU#3, or VOBU#4 in time. The PTS (0010h) of VOBU#3' is different from the PTS (0030h) of VOBU#3. When VOBU#2, VOBU#3', and VOBU#4 are reproduced in succession, the PTS at VOBU#3' thus becomes discontinuous and smaller than the STC. Hereinafter, a point at which discontinuity of the PTS occurs will be referred to as gap (boundary). Moreover, the VOBUs locating prior and subsequent to a gap will be referred to as preceding VOBU and succeeding VOBU, respectively.

In the example shown in FIG. 2, the DVD decoder in the DVD player detects STC>PTS at VOBU#3' under the synchronous management control as shown in FIG. 1, ending up with discarding the stream data. That is, VOBU#3' will not be reproduced.

To avoid such a problem, it is necessary to stop the synchronous management control in the presence of a gap, and to forcefully store the value of the PTS of VOBU#3' into the STC at the gap of the time Tg, the value of the PTS of VOBU#4 into the STC at the gap of the time Th. Such an intentional manipulation of the STC is called "STC gap processing" or simply "gap processing".

SUMMARY OF THE INVENTION

It is an object of the present invention to perform a synchronous management control of bit streams with facility and high accuracy and to properly reproduce the bit streams.

According to one of the aspects of the data decoder of the present invention, a detecting circuit detects a boundary in a bit stream row which is coded in compliance with a predetermined rule. The boundary is a point at which discontinuity of reproduction time occurs. An inverting circuit inverts, in response to the detection of the boundary by the detecting circuit, a specific bit in a header of a succeeding bit stream immediately subsequent to the boundary. This allows easy detection of the boundary by simply monitoring the specific bit, for example, at the time of outputting the decoded bit streams. This consequently facilitates synchronous management and the like of the bit streams. The specific bit is included in each of the bit streams. Thus, detecting the specific bit allows simple and accurate detection of the boundary in which discontinuity of the reproduction time occurs.

According to another aspect of the data decoder of the present invention, a synchronous control circuit performs a synchronous management control of discarding at least one of bit streams to be output or maintaining output of the bit streams in order to synchronize the reproduction time included in the bit streams with a reference clock. Moreover, the synchronous control circuit interrupts the synchronous management control when inversion of the specific bit in any one of the bit streams is detected. Since the specific bit included in each of the bit streams is used to detect the boundary, the synchronous management control can be surely interrupted in time with a target bit stream.

According to another aspect of the data decoder of the present invention, the specific bit is a marker bit in a PTS field of at least any one of a video pack, an audio pack, and a sub-picture pack, which are contained in a video object unit. The marker bit of the PTS field indicates segmentation of the PTS field, having no information in itself. Consequently, the information indicating a boundary can be written into bit streams without changing the header structure of the bit streams. That is, it is possible to accurately detect boundaries in which discontinuity of the reproduction time occurs, while following the existing DVD standard.

According to another aspect of the data decoder of the present invention, the specific bit is a marker bit in a DTS field of a video pack which is contained in a video object unit. The marker bit of the DTS field indicates segmentation of the DTS field, having no information in itself. Consequently, the information indicating a boundary can be written into bit streams without changing the header structure of the bit streams. That is, it is possible to accurately detect boundaries in which discontinuity of the reproduction time occurs, while following the existing DVD standard.

According to one of the aspects of the method of decoding data of the present invention, for decoding a bit stream row coded in compliance with a predetermined rule, performed first is detection of a boundary in the bit stream row in which discontinuity of reproduction time occurs. Next, a specific bit in a header of a succeeding bit stream immediately subsequent to the detected boundary is inverted. The bit streams are decoded to generate output bit streams. Then, in order to synchronize the reproduction time included in each of the bit streams with a reference clock, performed is a synchronous management control of discarding at least one of the output bit streams or of maintaining output of the output bit streams. The synchronous management control is interrupted when inversion of the specific bit in any of the output bit streams is detected. The boundary can thus be detected with facility and accuracy by simply monitoring the specific bit, for example, in outputting the decoded bit streams. Since the specific bit included in each of the bit streams is used to detect the boundary, the synchronous management control can be surely interrupted in time with a target bit stream.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENT

Hereinafter, an embodiment of the present invention will be described with reference to the drawings.

Figure 3:
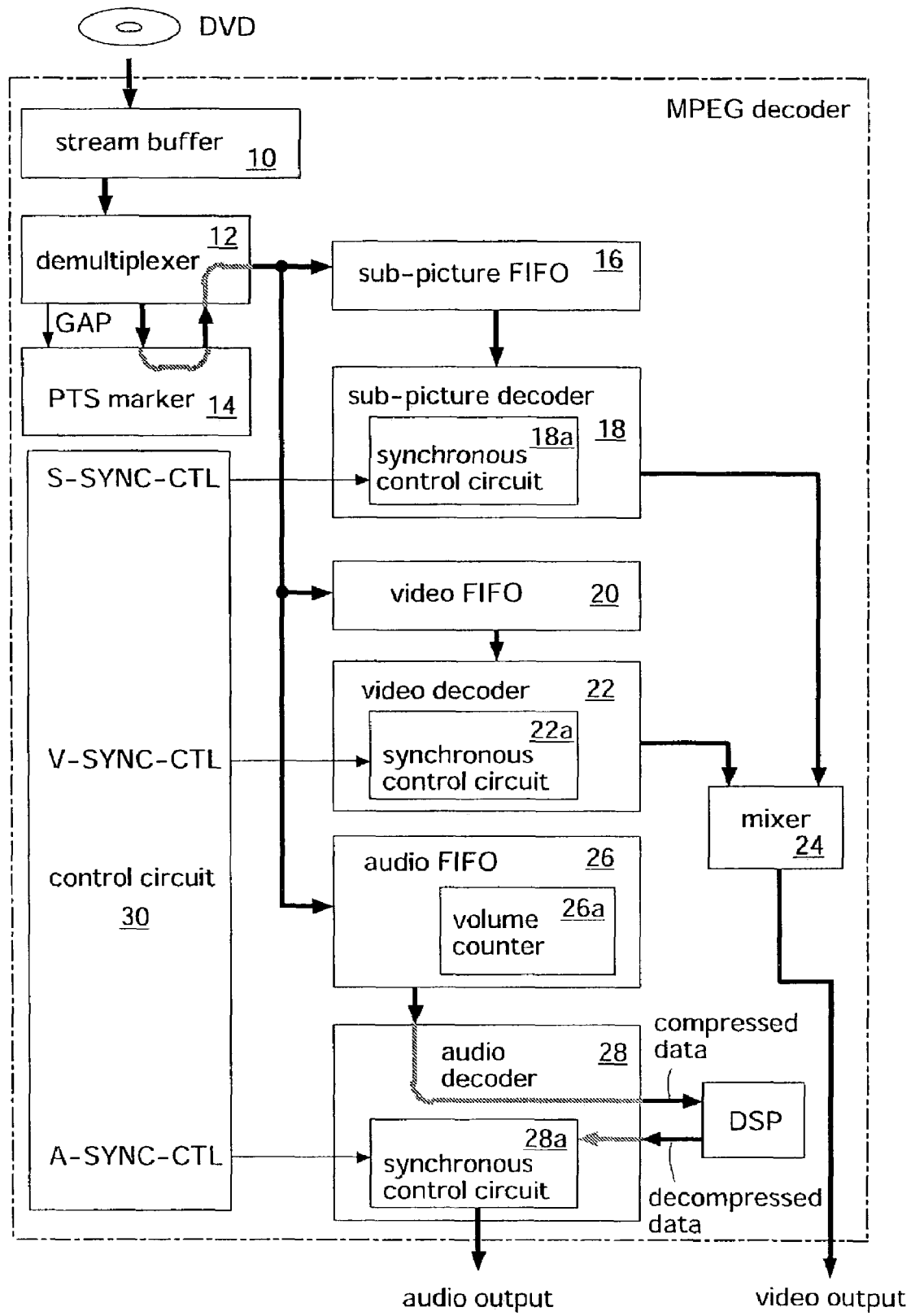
FIG. 3 is a block diagram showing an embodiment of the present invention.

FIG. 3 shows an MPEG decoder according to an embodiment of the present invention.

The MPEG decoder is formed as a single chip and is mounted on a DVD player. The MPEG decoder has a stream buffer 10, a demultiplexer 12, a PTS marker 14, an elementary stream FIFO 16 for sub pictures, a sub-picture decoder 18, an elementary stream FIFO 20 for video, a video decoder 22, a mixer 24, an elementary stream FIFO 26 for audio, an audio decoder 28, a DSP (Digital Signal Processor), and a control circuit 30 for controlling the entire MPEG decoder. The thick lines in the diagram show the flow of a bit stream row.

The stream buffer 10 temporarily stores stream data (MPEG2) that is read from a DVD medium or stream data (MPEG2) that is edited inside the DVD player for seamless playback.

The demultiplexer 12 outputs stream data (VOBU) transferred from the stream buffer 10 to the PTS marker 14, and separates stream data transferred from the PTS marker 14 into elementary streams for video, audio, and sub pictures. The demultiplexer 12 also outputs a gap detecting signal GAP when it detects discontinuity (gap) in the PTSs of VOBUs supplied in succession. That is, the demultiplexer 12 has the function of a detecting circuit for detecting a boundary in bit streams which are coded in accordance with the MPEG standard, the boundary being a point at which discontinuity of reproduction time occurs.

The PTS marker 14 inverts, in response to the gap detecting signal GAP, marker bits (specific bits) of PTS fields included in video packs V_PCK, audio packs A_PCK, and sub-picture packs SP_PCK in a succeeding VOBU (VOBU subsequent to a gap) transferred from the demultiplexer 12. That is, the PTS marker 14 has the function of an inverting circuit for modifying bit streams transferred from the demultiplexer 12 to put predetermined marks on the boundary between a preceding VOBU and a succeeding VOBU. The bit streams, including the succeeding VOBU (succeeding bit stream) having its marker bits inverted, are transferred to the demultiplexer 12.

Figure 4:
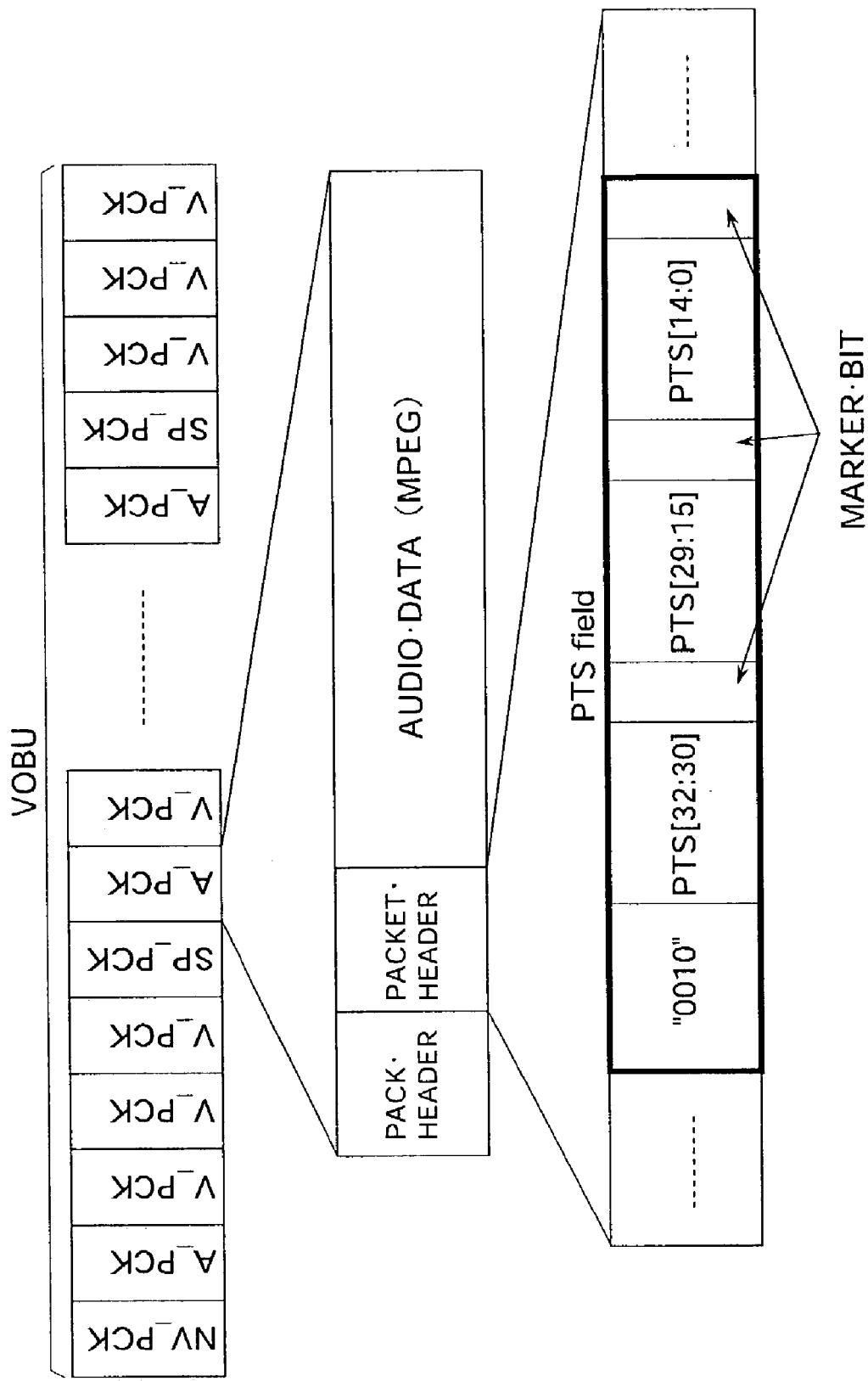
FIG. 4 is an explanatory diagram showing the details of a PTS field.

FIG. 4 shows the data structure of a VOBU.

A VOBU typically has a plurality of audio packs A_PCK, video packs V_PCK, and sub-picture packs SP_PCK which follow a navigation pack NV_PCK. The packs A_PCK, V_PCK, and SP_PCK each have a pack header, a packet header, and data (any of audio data, video data, and sub-picture data).

The packet header includes a PTS field. The PTS field contains a fixed value (in this example, "0010" in binary), followed by PTS bits (PTS[32:30]), a marker bit, PTS bits (PTS[29:15]), a marker bit, PTS bits ([14:0]), and a marker bit. Although not shown in the drawing, the PTS fields of the video packs V_PCK and the sub-picture packs SP_PCK have the same configuration as that of the PTS fields of the audio packs A_PCK.

In the present embodiment, the PTS marker 14 inverts marker bits of the PTS fields in an audio pack A_PCK, a video pack V_PCK, and a sub-picture pack SP_PCK of a succeeding VOBU, respectively, when it receives the gap detecting signal GAP. The marker bits are to indicate segmentation of the 33 PTS bits (PTS[32:0]), having no information in themselves. Therefore, problem will not arise even if marker bits are inverted at the time of detection of a gap.

The FIFO 16 shown in FIG. 3 holds a bit stream for sub pictures, and outputs the held data as sub-picture data in succession in accordance with instructions from the control circuit 30.

The sub-picture decoder 18 decodes the bit stream for sub pictures transferred from the FIFO 16, and outputs the resultant as an output bit stream. Here, a synchronous control circuit 18a starts a synchronous management control in accordance with a synchronous starting signal S-SYNC-CTL (for example, its turning to high level) from the control circuit 30. The synchronous control circuit 18a interrupts the synchronous management control immediately when a marker bit of a PTS field in the sub-picture data is inverted.

In accordance with the detection of a gap by the synchronous control circuit 18a, the control circuit 30 suspends the output of the synchronous starting signal S-SYNC-CTL. Here, the synchronous starting signal S-SYNC-CTL goes down from high level to low level, for example. The control circuit 30 outputs the synchronous starting signal S-SYNC-CTL again in synchronization with the completion of data output of the succeeding VOBU. The synchronous control circuit 18a resumes the synchronous management control in accordance with the synchronous starting signal S-SYNC-CTL.

The FIFO 20 holds a bit stream for video, and outputs the held data as video data in succession in accordance with instructions from the control circuit 30.

The video decoder 22 decodes the bit stream for video transferred from the FIFO 20, and outputs the resultant as an output bit stream. Here, a synchronous control circuit 22a starts a synchronous management control in accordance with a synchronous starting signal V-SYNC-CTL (for example, its turning to high level) from the control circuit 30. The synchronous control circuit 22a interrupts the synchronous management control immediately when a marker bit of a PTS field in the video data is inverted.

In accordance with the detection of a gap by the synchronous control circuit 22, the control circuit 30 suspends the output of the synchronous starting signal V-SYNC-CTL. Here, the synchronous starting signal V-SYNC-CTL goes down from high level to low level, for example. The control circuit 30 outputs the synchronous starting signal V-SYNC-CTL again in synchronization with the completion of data output of the succeeding VOBU. The synchronous control circuit 22a resumes the synchronous management control in accordance with the synchronous starting signal V-SYNC-CTL.

The mixer 24 adds (superimposes) the output bit stream from the sub-picture decoder 18 and the output bit stream from the video decoder 22, and outputs the resultant as picture data.

The FIFO 26 holds a bit stream for audio, and outputs the held data as audio data in succession in accordance with instructions from the control circuit 30. The FIFO 26 has a volume counter 26a for indicating the volume of data held. The volume counter 26a increments in response to the reception of audio data, and decrements in response to the output of audio data.

The audio decoder 28 reads the bit stream data for audio from the FIFO 26, and transfers the same to the DSP for decompression. The audio decoder 28 receives the data decompressed by the DSP with its synchronous control circuit 28a. The synchronous control circuit 28a starts a synchronous management control in accordance with a synchronous starting signal A-SYNC-CTL (for example, its turning to high level) from the control circuit 30. The synchronous control circuit 28a interrupts the synchronous management control immediately when a marker bit of a PTS field in the audio data is inverted.

The information (marker bits) indicating the boundary between the preceding VOBU and the succeeding VOBU is superimposed on the bit streams themselves. This allows perfect synchronization between the detection of the succeeding VOBU and the interruption of the synchronous management control. That is, the synchronous management control can be improved in accuracy.

Figure 1:
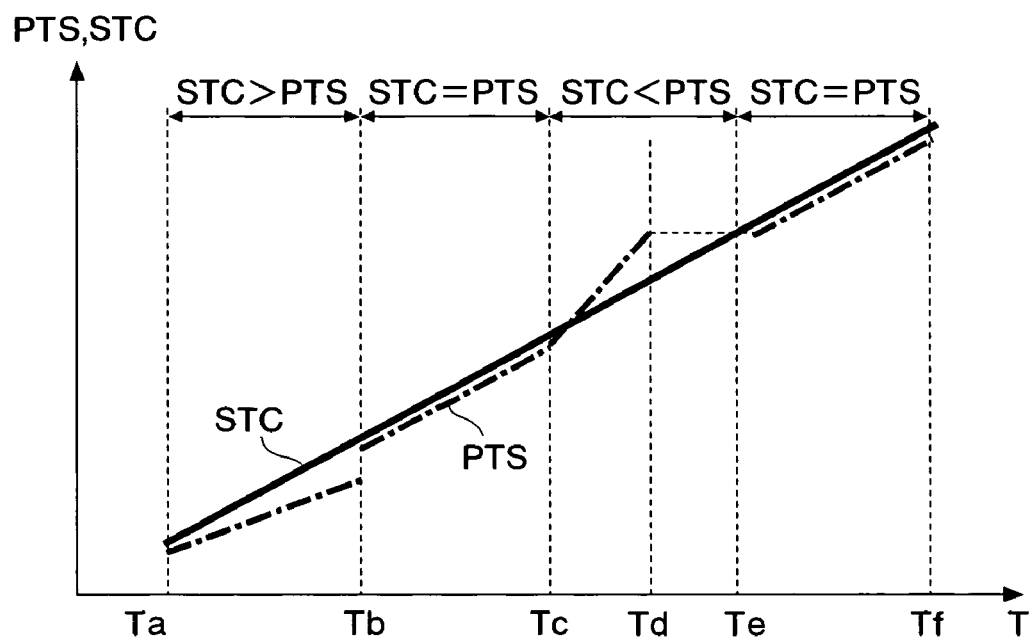
FIG. 1 is an explanatory diagram showing an overview of a synchronous management control of a conventional DVD decoder.
Figure 2:
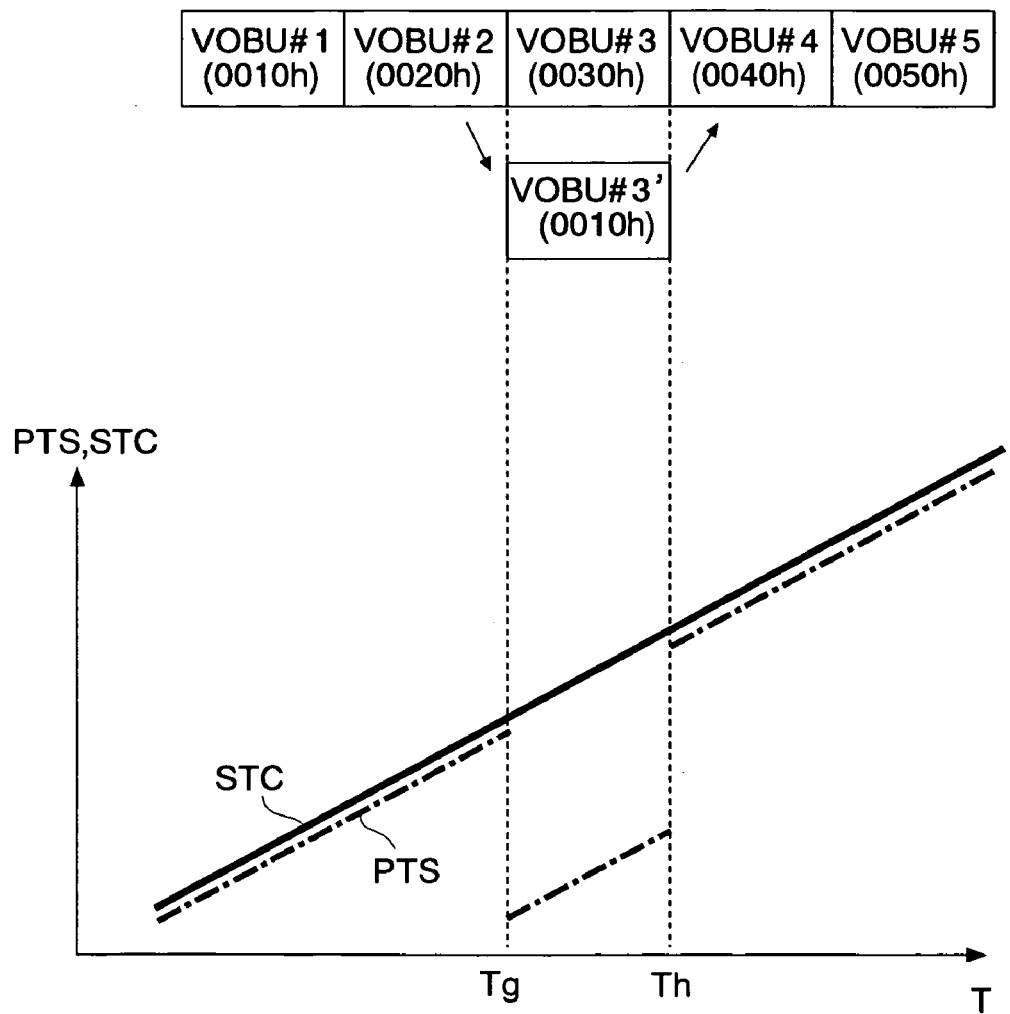
FIG. 2 is an explanatory diagram showing an example of the DVD playback method of the conventional DVD player.

The synchronous management control to be performed by the synchronous control circuits 18a, 22a, and 28a is the same as heretofore (FIGS. 1 and 2). That is, when none of the marker bits is inverted, the synchronous control circuits 18a, 22a, and 28a discard at least one of the bit streams to be output or maintain the output of the bit streams so that the PTS coincides with the STC (reference clock). Besides, when the synchronous control circuits 18a, 22a, and 28a detect inversion of marker bits, they interrupt the synchronous management control and perform the "STC gap processing".

The control circuit 30 instructs the sub-picture decoder 18, the video decoder 22, and the audio decoder 28 separately to restart the synchronous management. The synchronous management control is performed in minimum units of decoding. Here, the minimum units to the sub-picture decoder 18 are a screenful of sub-picture data, to the video decoder 22 a video frame for displaying a single screen, and to the audio decoder 28 an audio frame.

The control circuit 30 instructs of the restarting of the synchronous management in terms of times corresponding to integral multiples of these minimum units. A CPU which controls the entire DVD player may issue the instructions for the restarting of the synchronous management. A timer may also be used. Note that in this example the DSP decompresses only audio compressed data, however, in reality it also decompresses the sub-picture data and the video data.

Figure 5:
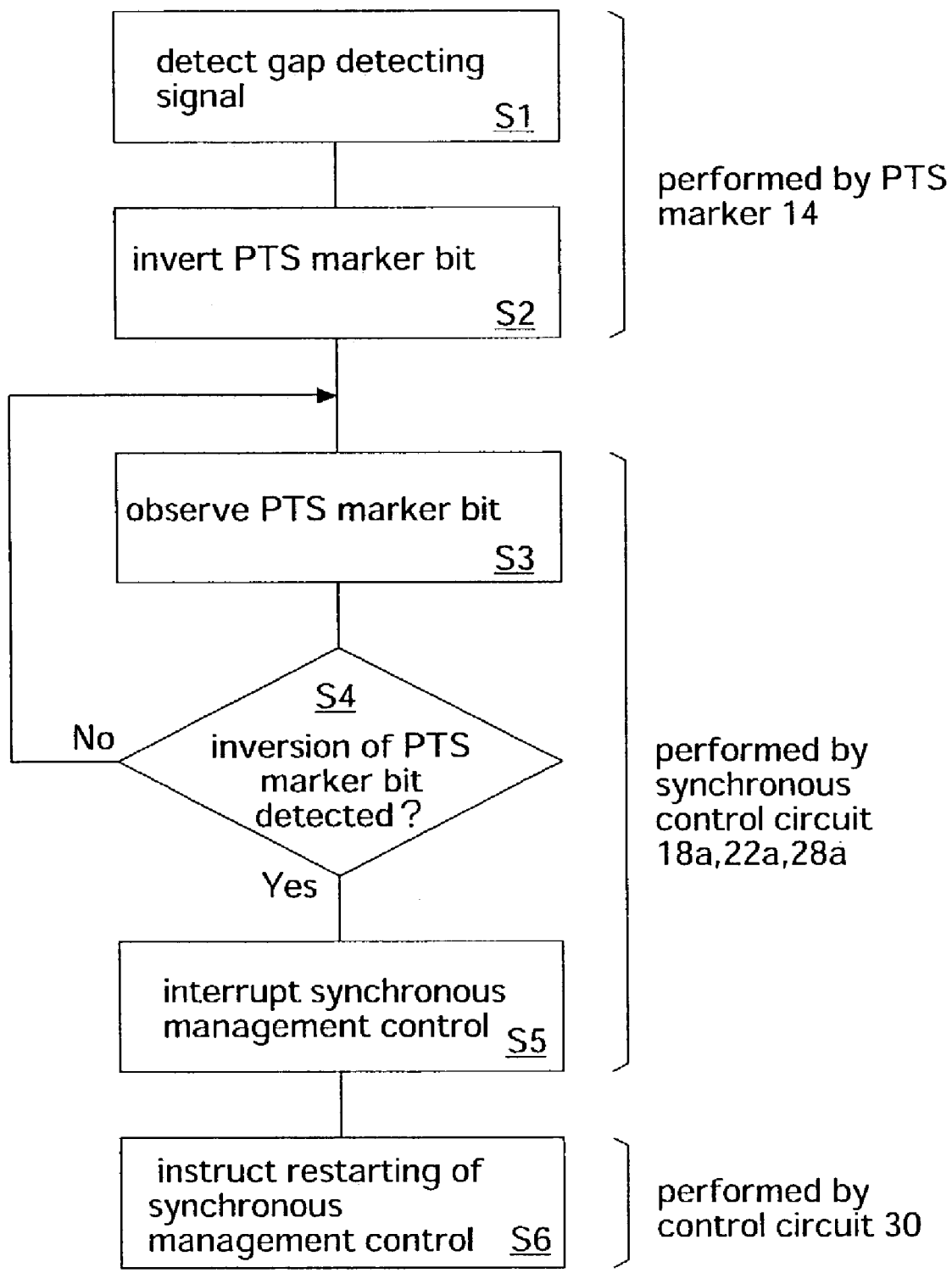
FIG. 5 is a flowchart showing the operation of FIG. 3.

FIG. 5 shows an overview of the synchronous management control. Steps S1 and S2 show processing to be performed by the PTS marker 14. Steps S3, S4, and S5 show processing to be performed by any of the synchronous control circuits 18a, 22a, and 28a. Step S6 show processing to be performed by the control circuit 30.

At step S1, the PTS marker 14 detects the presence or absence of the gap detecting signal GAP. At step S2, the PTS marker 14 inverts marker bits of the PTS fields in synchronization with the reception of the gap detecting signal GAP.

At step S3, the synchronous control circuits 18a, 22a, and 28a monitor the marker bits of the respective PTS fields. At step S4, it is determined whether or not inversion of the marker bits of the PTS fields is detected. If the inversion of the marker bit of any one of the PTS fields is detected, the processing moves to step S5. If the inversion of the marker bits is not detected, the processing returns to step S3. At step S5, the synchronous control circuit (any of 18a, 22a, and 28a) that has detected the inversion of the marker bit interrupts the synchronous management control.

At step S6, the control circuit 30 instructs the synchronous control circuit (any of 18a, 22a, and 28a) having interrupted the synchronous management control to restart the synchronous management.

Figure 6:
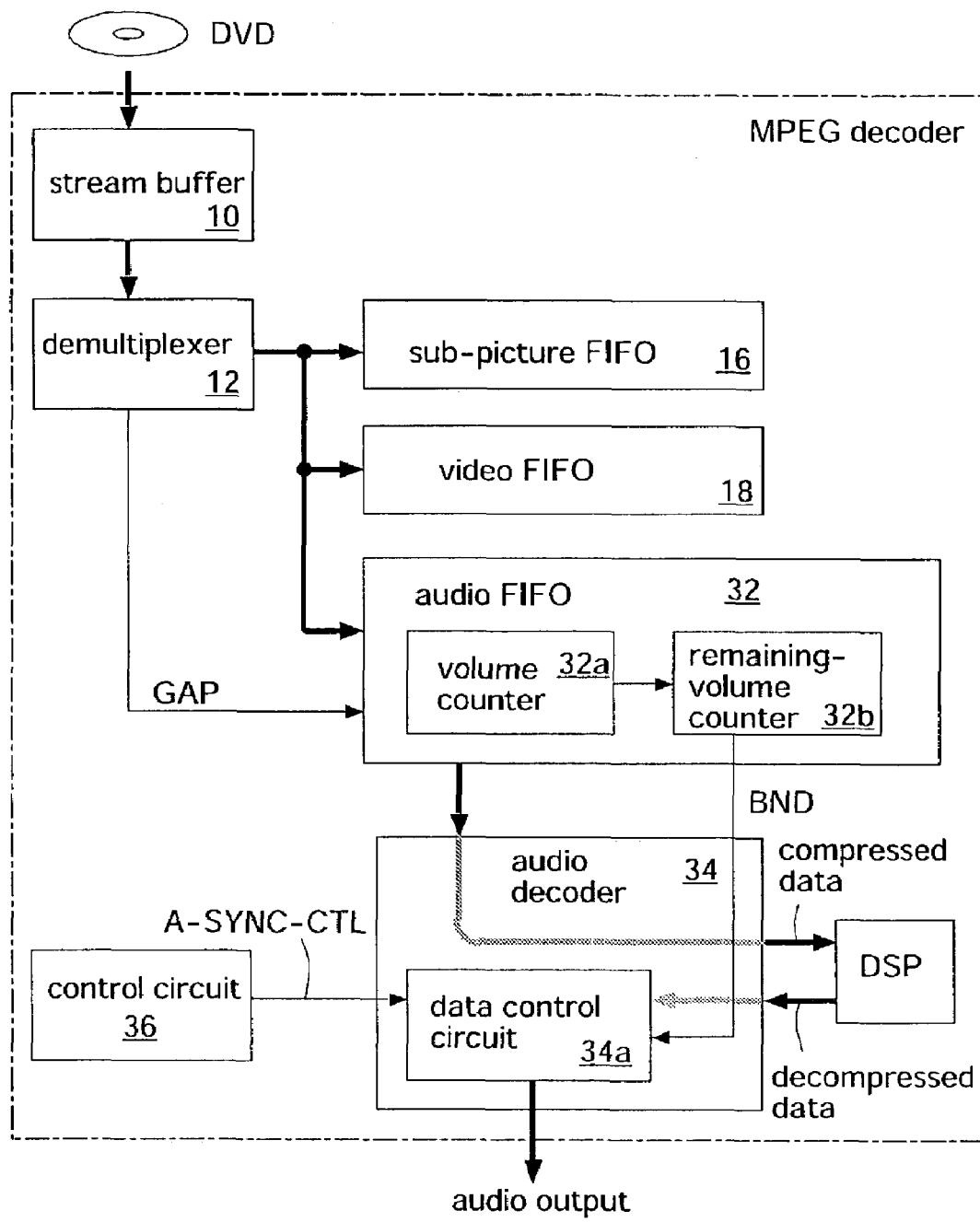
FIG. 6 is a block diagram showing a comparative example of the present invention.

FIG. 6 shows a comparative example of the synchronous management control. Here, description will be given of the synchronous management control on audio data alone.

In the MPEG decoder of the comparative example, the demultiplexer 12 outputs the gap detecting signal GAP to an elementary stream FIFO 32 for audio. The FIFO 32 for holding the audio bit stream has a remaining-volume counter 32b in addition to a volume counter 32a. The FIFO 32 transfers the value of the volume counter 32a to the remaining-volume counter 32b when it receives the gap detecting signal GAP. What is held by the volume counter 32a upon detection of the gap detecting signal GAP is the data on the preceding VOBU. Thus, the value of the remaining-volume counter 32b coincides with the volume of data of the preceding VOBU.

The value of the remaining-volume counter 32b decrements to zero as the audio data in the FIFO 32 is consumed. When the data of the preceding VOBU in the FIFO 32 is all consumed, the count of the remaining-volume counter 32b is zero. Here, the FIFO 32 outputs a boundary notice signal BND to a synchronous control circuit 34a of an audio decoder 34.

The synchronous control circuit 34a temporarily suspends the synchronous management control upon receiving the boundary notice signal BND. Subsequently, the synchronous control circuit 34a receives a synchronous starting signal A-SYNC-CTL from a control circuit 36, and starts the synchronous management again.

Figure 7:
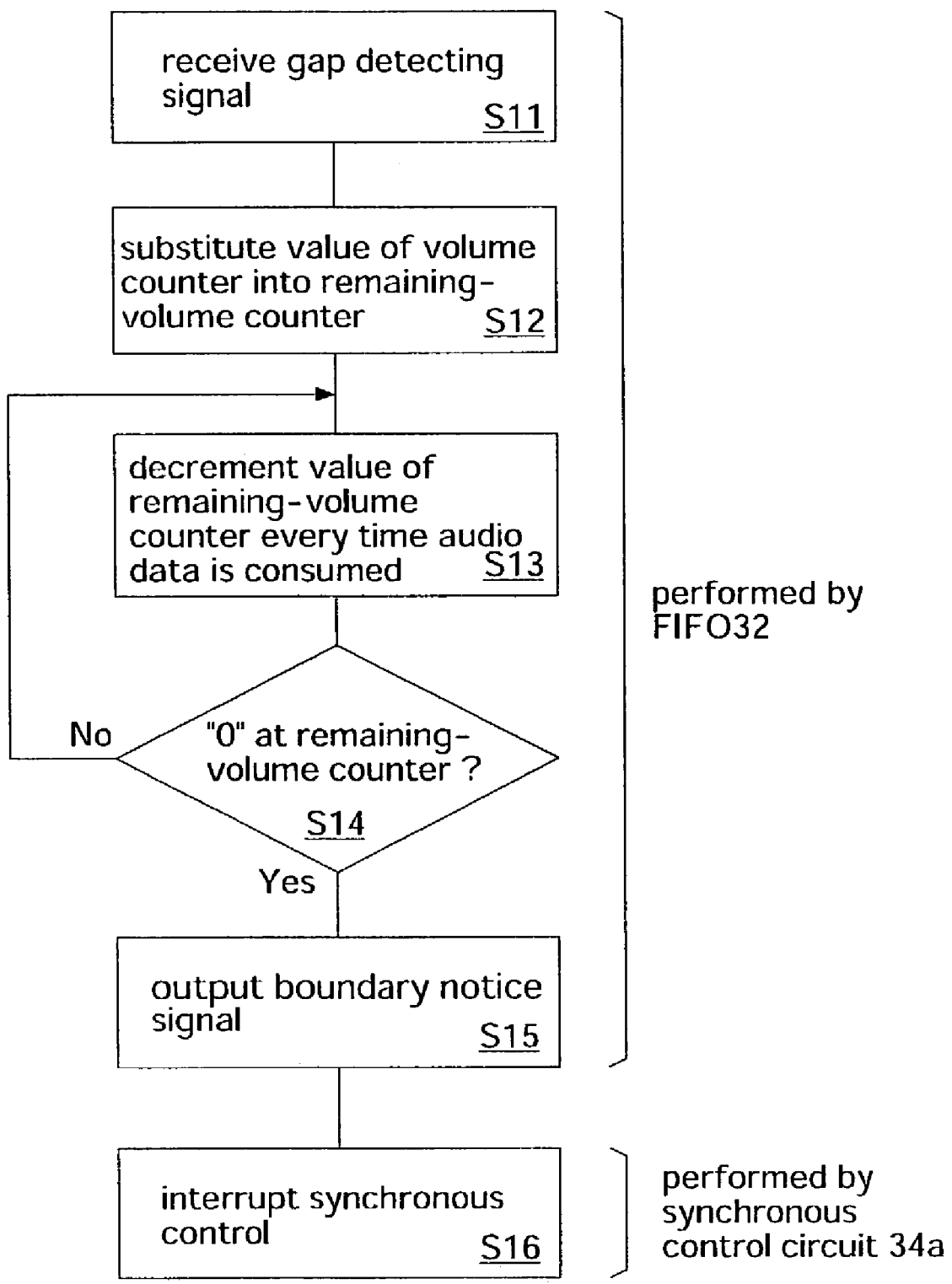
FIG. 7 is a flowchart showing the operation of the comparative example.

FIG. 7 shows an overview of the synchronous management control in the comparative example.

At step S11, the FIFO 32 receives the gap detecting signal GAP. At step S12, the FIFO 32 substitutes the value of the volume counter 32a into the remaining-volume counter 32b.

At step S13, the value of the remaining-volume counter 32b decrements as the audio data is consumed. At step S14, it is determined whether or not the remaining-volume counter 32b is zero. If the remaining-volume counter 32b is not zero, the processing returns to step S13. If the remaining-volume counter 32b is zero, the processing moves to step S15.

At step S15, the remaining-volume counter 32b outputs the boundary notice signal BND. At step S16, the synchronous control circuit 34a suspends the synchronous management control upon receiving the boundary notice signal BND.

In the comparative example described above, the output timing of the boundary notice signal BND comes earlier than the time at which the top data of the succeeding VOBU is transferred to the synchronous control circuit 34a, because of the decoding time of the DSP. That is, the synchronous management control is interrupted when the data of the preceding VOBU is output.

As a preventive measure against this, the output timing of the boundary notice signal BND can be delayed by the time amount corresponding to the decoding lag in the DSP. The time taken for decoding data in the DSP, however, varies with the compression rate of the data. For example, it requires a longer time to decode data with low compression rate such as linear PCM than data with high compression rate such as Dolby AC-3. Consequently, in the comparative example described above, it is difficult to interrupt the synchronous management control accurately in time with the top of the succeeding VOBU (in synchronization with the detection of a gap).

As has been described, according to the present embodiment, the PTS marker 14 inverts the marker bits of the PTS fields in a video pack V_PCK, an audio pack A_PCK, and a sub-picture pack SP_PCK in response to the detection of a boundary. That is, the information indicating a boundary in which discontinuity of the reproduction time occurs is written into the marker bits of the bit streams which include the data to be reproduced. Consequently, in outputting the bit streams decoded, the boundary in which discontinuity of the reproduction time occurs can be detected with facility and accuracy by simply monitoring the marker bits. It is possible to accurately detect the boundary in which discontinuity of the reproduction time occurs, while following the existing DVD standard.

The synchronous control circuits 18a, 22a, and 28a interrupt the synchronous management control when they detect inversion of the marker bits. Since the marker bits included in the bit streams are used to detect a boundary, the synchronous management control can be interrupted accurately in time with a target bit stream.

Figure 8:
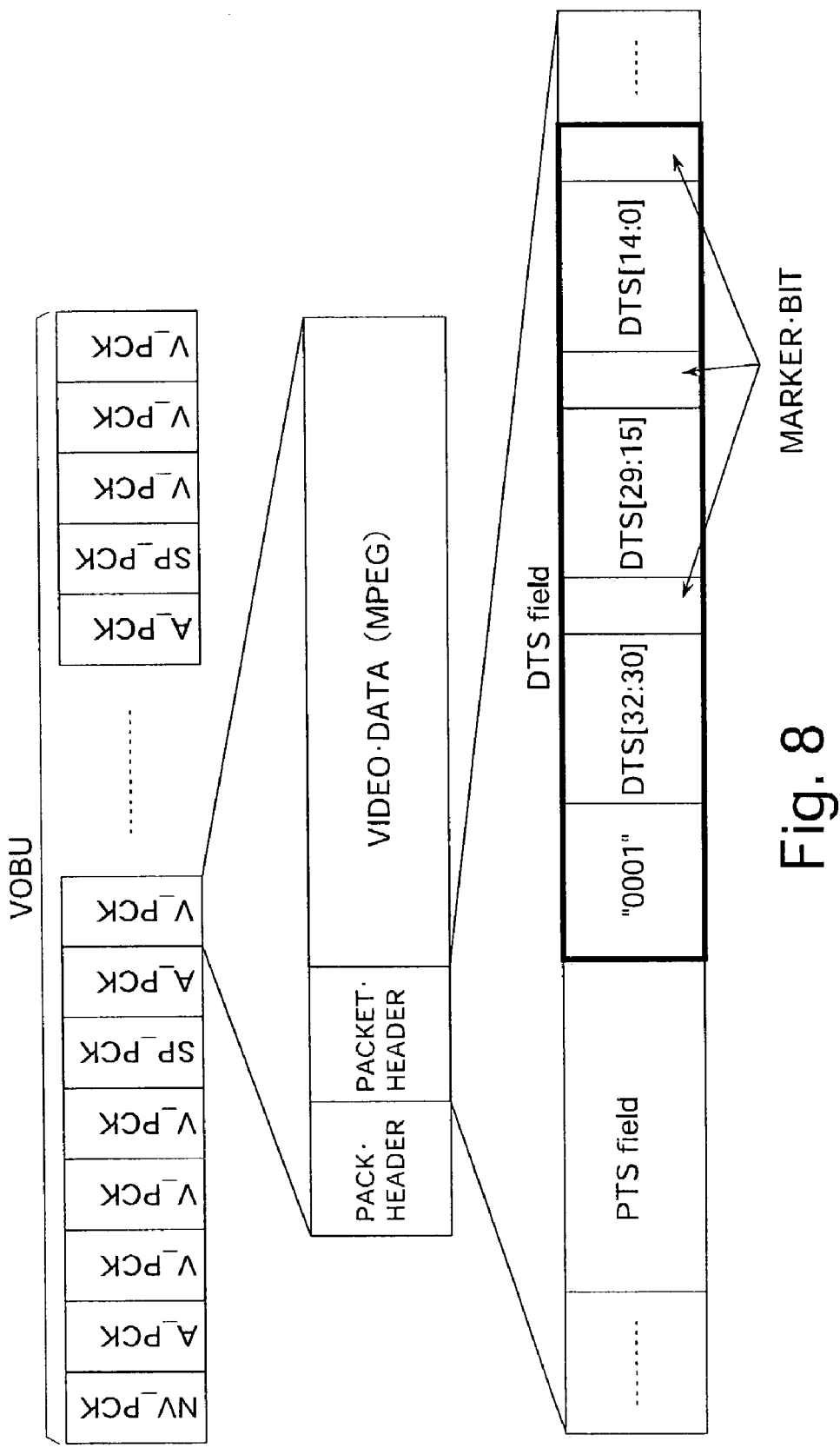
FIG. 8 is an explanatory diagram showing the details of a DTS field.

Note that the foregoing embodiment has dealt with the case of inverting the marker bits of PTS fields. However, the present invention is not limited to such an embodiment. For example, the marker bits of DTS (Decode Time Stamp) fields may be inverted. FIG. 8 shows the details of a DTS field in the packet header of a video pack V_PCK. The DTS field is the same as the PTS field in structure except that it has a different top fixed value (four bits).

The foregoing embodiment has dealt with the case where the present invention is applied to an MPEG decoder for decoding bit streams recorded on a DVD (MPEG2). However, the present invention is not limited to such an embodiment. For example, the present invention may be applied to decoders of other MPEG systems (MPEG1, MPEG4).

What is claimed is:

1. A data decoder comprising:
   a detecting circuit for detecting a boundary in a bit stream row coded in compliance with a predetermined rule, the boundary being a point at which discontinuity of reproduction time occurs; and
   an inverting circuit for inverting, in response to the detection of said boundary by said detecting circuit, a specific bit in a header of a succeeding bit stream immediately subsequent to said boundary.

2. The data decoder according to claim 1, comprising a synchronous control circuit for performing a synchronous management control of discarding at least one of bit streams to be output or of maintaining output of the bit streams in order to synchronize the reproduction time included in the bit streams with a reference clock, and for interrupting said synchronous management control when inversion of said specific bit in any one of said bit streams is detected.

3. The data decoder according to claim 1, wherein said predetermined rule is an MPEG standard.

4. The data decoder according to claim 3, wherein said specific bit is a marker bit in a PTS field of at least any one of a video pack, an audio pack, and a sub-picture pack which are included in a video object unit.

5. The data decoder according to claim 3, wherein said specific bit is a marker bit in a DTS field of a video pack which is included in a video object unit.

6. A method of decoding data comprising the steps of:
   detecting a boundary in a bit stream row coded in compliance with a predetermined rule, the boundary being a point at which discontinuity of reproduction time occurs;

inverting a specific bit in a header of a succeeding bit stream immediately subsequent to said boundary;

decoding bit streams to generate output bit streams;

performing a synchronous management control of discarding at least one of said output bit streams or of maintaining output of said output bit streams in order to synchronize the reproduction time included in the bit streams with a reference clock; and interrupting said synchronous management control when inversion of said specific bit in any one of said output bit streams is detected.

7. The method of decoding data according to claim 6, wherein said predetermined rule is an MPEG standard.

* * * * *

UNITED STATES PATENT AND TRADEMARK OFFICE
CERTIFICATE OF CORRECTION

PATENT NO. : 7,039,849 B2 Page 1 of 1
APPLICATION NO. : 10/436144
DATED : May 2, 2006
INVENTOR(S) : Tadayoshi Kono et al.

It is certified that error appears in the above-identified patent and that said Letters Patent is hereby corrected as shown below:

Page Column 2 (Other Publications), Line 1, after "et al." insert --,--.

Page Column 2 (Other Publications), Line 5, after "et al." insert --,--.

Page Column 2 (Other Publications), Line 6, change 'decoder,'IEEE" to --decoder,'IEEE--.

Page Column 2 (Other Publications), Line 9, after "et al." insert --,--.

Page Column 2 (Other Publications), Line 13, change "World'.," to --World',--.

Signed and Sealed this

Fourteenth Day of November, 2006

JON W. DUDAS
*Director of the United States Patent and Trademark Office*

UNITED STATES PATENT AND TRADEMARK OFFICE
CERTIFICATE OF CORRECTION

PATENT NO.         : 7,039,849 B2
APPLICATION NO. : 10/436144
DATED              : May 2, 2006
INVENTOR(S)        : Tadayoshi Kono et al.

Page 1 of 1

It is certified that error appears in the above-identified patent and that said Letters Patent is hereby corrected as shown below:

Title Page Column 2 (Other Publications), Line 1, after "et al." insert --,--.

Title Page Column 2 (Other Publications), Line 5, after "et al." insert --,--.

Title Page Column 2 (Other Publications), Line 6 change "decoder,'IEEE" to --decoder,' IEEE--.

Title Page Column 2 (Other Publications), Line 9, after "et al." insert --,--.

Title Page Column 2 (Other Publications), Line 13, change "World'.," to --World',--.

Signed and Sealed this

Thirteenth Day of February, 2007

JON W. DUDAS
*Director of the United States Patent and Trademark Office*